United States Patent [19]

Vaskunas et al.

[11] 3,749,889

[45] July 31, 1973

[54] READER APPARATUS FOR READING RECORD MATERIALS AT SPEEDS WHICH ARE INDEPENDENT OF RECORDING SPEEDS

[75] Inventors: Vygantas A. Vaskunas, Masspequa Park; Howard K. Hager, Nesconset, both of N.Y.

[73] Assignee: Interface Industries, Inc., Hauppauge, N.Y.

[22] Filed: Aug. 19, 1971

[21] Appl. No.: 173,018

[52] U.S. Cl. .................... 235/61.11 D, 340/174.1 H

[51] Int. Cl. .......................... G06k 7/08, G11b 5/00

[58] Field of Search .................. 235/61.114, 61.7 B; 340/174.1 H, 347 DD, 149 A; 346/74 M

[56] References Cited

UNITED STATES PATENTS

| | | | |
|---|---|---|---|
| 3,597,751 | 8/1971 | Heidecker et al. | 340/174.1 H |
| 3,537,084 | 10/1970 | Behr | 340/174.1 H |
| 3,593,334 | 7/1971 | Bickel | 340/174.1 H |
| 3,624,521 | 11/1971 | Dellicicchi | 340/174.1 H |
| 3,641,524 | 2/1972 | Norris | 340/174.1 H |

*Primary Examiner*—Daryl W. Cook
*Attorney*—Louis E. Marn, James C. Jangarathis and Marvin S. Gittes et al.

[57] ABSTRACT

Variable speed reader apparatus for reproducing digital information is provided in accordance with the teachings of the present invention wherein record materials are traversed by a reading head whose relative motion therewith may be substantially different from that at which recording took place. The resulting waveform is amplified and applied to a threshold device so that a digital representation thereof is regenerated. The regenerated waveform is then applied to a jitter compensating decoder network which acts to recover true data by deriving clocking pulses from said regenerated waveform and employing such derived clocking pulses, which jitter with the regenerated waveform, to decode such regenerated waveform to obtain true data therefrom. The recovered data may then be applied in serial manner to a single character register whereby it may be buffered and further applied to utilization apparatus therefor.

25 Claims, 5 Drawing Figures

INVENTORS
Vygantas A. Vaskunas
Howard K. Hager
BY
Marn & Jangarathis
ATTORNEYS

INVENTORS
Vygantas A. Vaskunas
Howard K. Hager
BY
Marn & Jangarathis
ATTORNEYS

READER APPARATUS FOR READING RECORD MATERIALS AT SPEEDS WHICH ARE INDEPENDENT OF RECORDING SPEEDS

This invention relates to data retrieval systems and more particularly to variable speed apparatus for reading and further processing digital data stored on magnetic recording mediums.

Digital data stored on magnetic mediums such as drums, discs, tapes and the like is generally recorded at high speeds so that a high density data population is obtained and read at the same speed at which data was recorded so that sharply defined pulses representing the information stored may be recovered. When the magnetic recording medium is read in this manner the information stored on the recording medium is often obtained at a faster rate than it can be processed, especially when the data is read at a location remote from a central computer and is supplied thereto over telephone lines or the like. The problem becomes acute when the magnetic medium being read is a magnetic stripe on a credit card or the like which is limited in length and read only by single head reading devices which transmit the data obtained to a central computer which acts to further process such data by way of comparing it to records associated with the information obtained from the magnetic stripe and thereafter provides an indication as to whether the sale is to be approved or otherwise indicates that some requested action of the cardholder is to be approved or denied.

The magnetic stripe of a credit card or the like employed in this manner must be recorded at high speeds to ensure that a high density data population is obtained because the space available thereon is limited. However, if such magnetic stripe is read at the same speed at which recording took place, data will be obtained at a much faster rate than it can be processed. For instance, the magnetic data stripe conventionally employed on credit cards, identification cards and the like in common use today are typically recorded, using double frequency recording techniques, between 7½ ips, which is equivalent to 70 characters per second, and alternatively at 3¾ ips. These recording speeds are advantageous because a magnetic stripe having high digital information density results and this is a virtual necessity due to the limited storage area available with such magnetic stripes. So long as the magnetic stripe is read at the same speed at which it was recorded, a digital waveform having sharply defined information pulses may be easily retrieved and jitter, the small, rapid variations in the reproduced waveform due to recording mechanism instability, such as jitter on the medium read, mechanical virbrations, fluctuations in the supply voltage, control system instability, etc., does not present onerous problems provided equipment of reasonable quality is employed. However, since magnetic credit card reading apparatus or the like using conventional low speed circuits, i.e. 110 baud or 10 characters per second, cannot usually further process data presented thereto at speeds equal to the recording speed of the magnetic stripe, such magnetic credit card readers must employ rather large serial buffers to store the information derived from the magnetic stripe and read it out to a utilization circuit therefor at a sufficiently slow rate so that it may be further processed. As such buffers generally take the form of a serial register with average storage for 84 characters or 586 bits, it will be appreciated that the requirement for such large buffers becomes a rather expensive item in the total cost of the credit card reader manufactured and often mandates dimensional requirements for the reader apparatus which are undesirable when such reader apparatus is viewed from the standpoint of a countertop item which must not substantially reduce available selling space. Furthermore, high reading or playback speeds dictate close mechanical design tolerances for such reader apparatus which act to further increase the manufacturing cost.

This invention proceeds upon the recognition that so long as appropriate signal magnitudes are maintained and jitter is compensated when slow reading speeds are employed, digital data recorded on magnetic mediums may be read out by appropriately designed reader apparatus at speeds which are independent of the recording speed and hence may be selected to be equal to the data rate at which such reader apparatus may accept, further process and transmit data therefrom.

Therefore, it is an object of the present invention to provide variable speed reader apparatus for reading digital data stored on magnetic mediums and supplying the data obtained to utilization devices therefor.

It is a further object of the present invention to provide reader apparatus capable of reading digital information stored on a magnetic medium at speeds which are independent of the recording speed of such magnetic medium and equal to the speed at which the data obtained may be further processed.

It is another object of the present invention to provide reader apparatus capable of reading magnetic mediums having either high or low density digital information recorded thereon at speeds commensurate with the rate at which data obtained therefrom can be further processed.

It is an additional object of the present invention to provide a jitter compensating decoder network for reader apparatus of the foregoing kind wherein clocking pulses developed from the information read will jitter with the input waveform to enable the data recorded on a magnetic medium to be accurately recovered despite the speed at which it is read and any additional jitter introduced thereby.

Other objects and advantages of the present invention will become clear from the following detailed description of an exemplary embodiment thereof, and the novel features of the instant invention will be particularly pointed out in conjunction with the appended claims.

Although the concepts underlying the present invention are set forth hereinafter in conjunction with an exemplary embodiment which contemplates variable speed reader apparatus for credit cards and the like, wherein a magnetic stripe on a card is read at a substantially slower speed than that at which recording took place, it will be appreciated that the instant invention admits of wide application and allows magnetic mediums having digital data thereon to be read at any desired speed. Thus, a magnetic medium of any conventional format may be read by the variable speed reading apparatus taught herein and although the principal application of the instant invention is presently considered to reside in fields of endeavor wherein a magnetic medium is read at slower speeds than those at which recording took place, precisely the same concepts as are set forth herein would allow such magnetic mediums to be read at speeds which are substantially in excess of those at which recording took place. Furthermore, the self clocking features of the jitter compensating decoder network taught herein are fully applicable to any reader or playback system for record materials which are recorded according to double frequency recording techniques.

In accordance with the teachings of the present invention variable speed reader apparatus for reproducing digital information is provided wherein record materials are traversed by a reading head whose relative motion therewith may be substantially different from that at which recording took place, the resulting waveform is amplified and applied to a threshold device so that a digital representation thereof is regenerated; the regenerated waveform is then applied to a jitter compensating decoder network which acts to recover true data from the double frequency recording by deriving clocking pulses from said regenerated waveform and employing the derived clocking pulses, which jitter with the regenerated waveform, to decode such regenerated waveform to obtain true data therefrom; the recovered data may be applied in serial manner to a single character register whereby it may be buffered and further applied to utilization apparatus therefor.

The invention will be more clearly understood by reference to the following detailed description of an embodiment thereof in conjunction with the accompanying drawings in which.

Figures 1A, 1B, 1C:
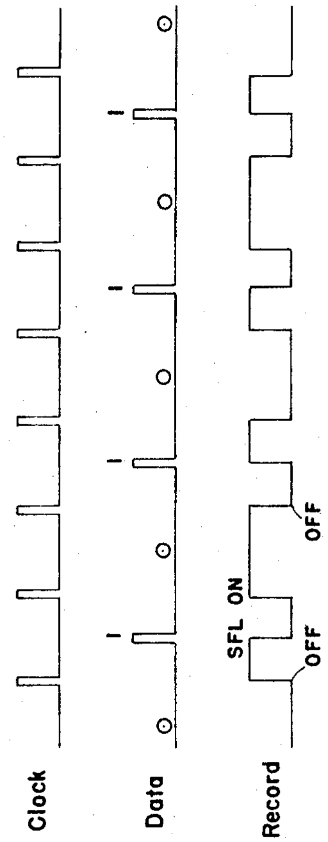
FIGS. 1A through 1C illustrate the manner in which digital information is recorded on a magnetic medium according to a conventional double frequency recording technique to form a data record suitable for reading by the variable speed reader apparatus contemplated by the present invention.

Referring now to the drawings and more particularly to FIG. 1 thereof, there is illustrated a typical double frequency technique for recording digital information on a magnetic medium to form a data record suitable for reading by the variable speed reader apparatus contemplated by the present invention. More particularly the waveform illustrated in FIG. 1A represents a clock frequency input and the waveform depicted in FIG. 1B illustrates digital information to be recorded wherein Ones (1's) are represented, as indicated, by single pulses displaying rapid rise and fall times while Zeros (0's) are represented by an absence of a pulse to yield the unipolar binary waveform illustrated in FIG. 1B. The time relationship between the clock input shown in FIG. 1A and the data input shown in FIG. 1B is obtained by delaying the clock input by an interval equal to one-half the repetition rate of the data input so that clocking pulses will occur intermediate to the bit positions in the data waveform illustrated in FIG. 1B. The waveforms illustrated in FIGS. 1A and 1B are then applied to an OR gate whose output is connected to a flip-flop in the well-known manner. The output of the flip-flop is indicated in FIG. 1C and this is the resulting waveform which is recorded. As will be appreciated by those of ordinary skill in the art, one of the principal problems associated with the recovery of digital information from a waveform such as that illustrated by the waveform in FIG. 1C, is that the clocking pulses must be separated out within the reader apparatus so that a consistent, true digital representation for 1's and 0's may be obtained. An additional problem, as will be appreciated by those of ordinary skill in the art, is that when information is read from a magnetic medium recorded in the foregoing manner at a slower speed than that employed in recording, the resultant waveform obtained at the output of the reproducing or playback head takes the form of extremely low magnitude pulses whose rise and fall times are not substantially vertical, but instead, exhibit relatively slow rates of rise and decay. Furthermore, decreasing the reproduction speed with respect to the recording speed increases the effects of jitter. For the purpose of understanding the description of the exemplary embodiment of the present invention set forth hereinafter, it shall be assumed that the magnetic recording medium takes the form of a magnetic stripe on a credit card or the like, which was recorded at 7½ ips or 70 characters per second and is to be read by the variable speed reader apparatus illustrated in FIG. 2 at 110 bauds or 10 characters per second which is the same rate that conventional low speed circuits may send data over telephone lines or the like to a central processing computer location.

Figure 2:
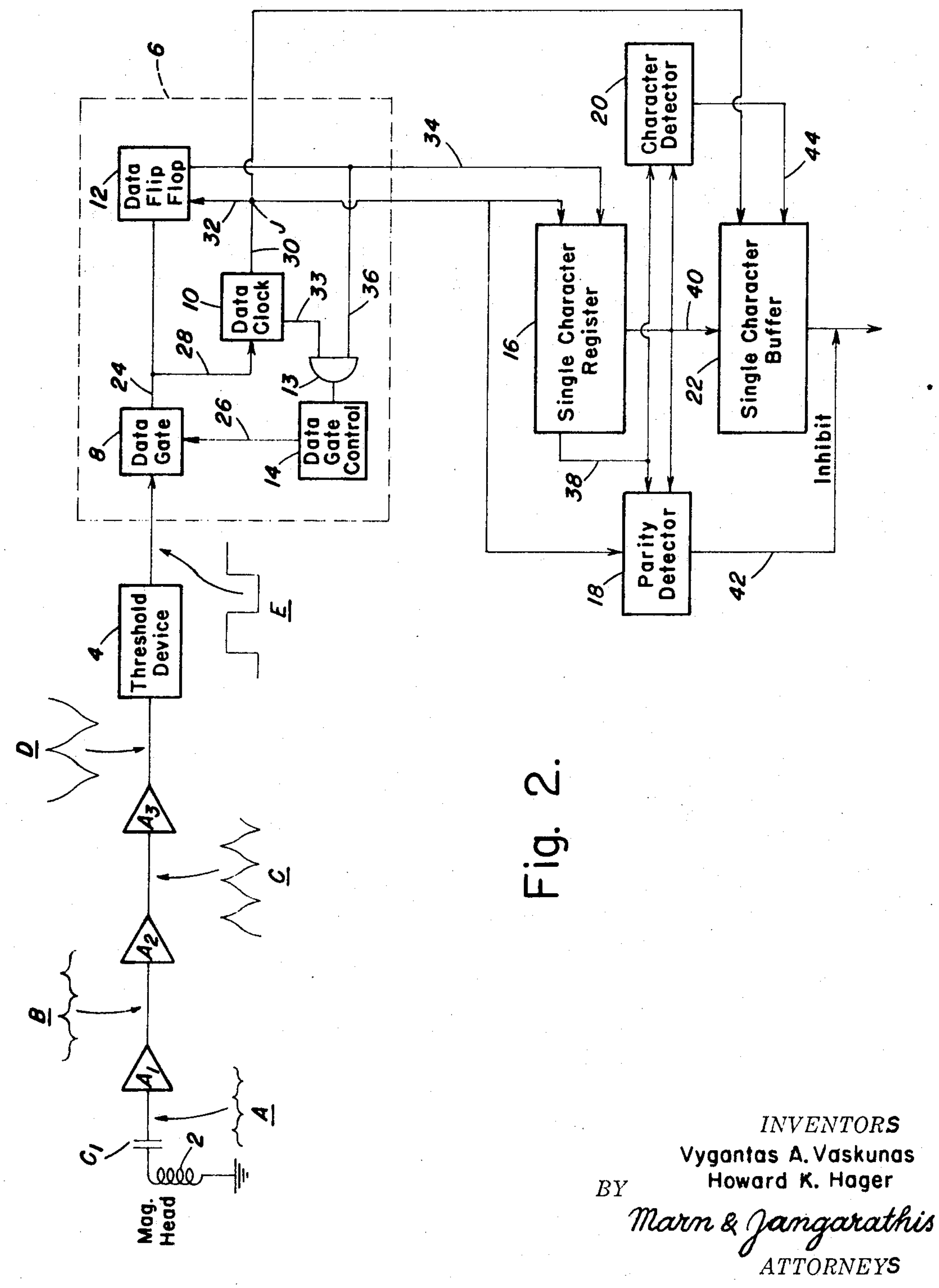
FIG. 2 is a block diagram of an exemplary embodiment of variable speed reader apparatus according to the present invention.

Referring now to FIG. 2, there is shown a block diagram of an exemplary embodiment of variable speed reader apparatus according to the present invention, which in a consistent manner with the foregoing assumption, may be assumed to be designed to read magnetic mediums recorded at 70 characters per second at a rate of 10 characters per second and to send true digital information obtained upon the reading of such magnetic medium to a central computer over low speed telephone circuits at a rate of 10 characters per second. As shall be seen below, since the speed at which true data is sent over low speed telephone circuits is the same as that at which the magnetic medium is read, only a single character register and buffer is required in the variable speed reader apparatus according to the present invention rather than the large serial buffers, i.e., 84 characters or 586 bits, normally required in conventional reader apparatus of this nature which reproduces the magnetic medium at the same speed as recording took place. The exemplary embodiment of the variable reader apparatus according to the present invention, as depicted in FIG. 2, comprises a magnetic read head 2; amplifying means $A_1$–$A_3$; a threshold device 4; a jitter compensating decoder network indicated by the dashed block 6 and formed by data gate 8, data clock 10, data flip-flop 12, And gate 13, and data gate control 14; a single character register means 16; a parity detector 18; the character detector 20 and a single character buffer 22. Although the magnetic medium to be read may take any conventional format, if it is here assumed that such magnetic medium is in the form of a conventional magnetic stripe on a credit card or the like, the magnetic read head 2 may conveniently take the form of a ¼ track, high inductance read head. As it was assumed above that the reading speed is to be less than the speed at which recording took place, the magnetic read head 2 should preferably exhibit an inductance and gap which is as high as commercially feasible. A high inductance (0.5–2h) read head having a gap of 0.25–1 mils. to read high or low density recordings has been found to be highly satisfactory for this purpose. The alignment of the magnetic read head 2 when scanning the magnetic medium is preferably the same as that of the recording head as skew is important for signal strength which would here be low due to the low reading speeds employed. The magnetic read head 2 is adapted for relative motion with the magnetic medium to be read and any conventional means for imparting such relative motion therebetween may be employed. For instance, the magnetic read head may be moved across the magnetic stripe on the card by motor driven gearing arrangements or the magnetic stripe on the card may be driven past the magnetic read head 2 by similar arrangements. Alternatively both the magnetic read head 2 and the magnetic medium to be read may each be driven; however, this arrangement would not ordinarily be employed in credit card readers or the like as the resulting apparatus would be more complex and expensive to manufacture than would normally be justifiable in such a simple embodiment of the present invention. Under any of the foregoing arrangements for placing the magnetic read head 2 and the magnetic medium in relative motion, the motor driven gearing arrangements may be provided, in any conventional manner, with several selected speed ratios so that magnetic mediums recorded at several standard speeds could be read at rates calculated to provide the uniform character rate at which the data could be further processed which would, under the assumption set forth above, be 10 characters per second. For example, if variable speed credit card reader apparatus is again considered, three speed gear ratios would normally be provided so that high density magnetic stripes recorded at 7½ and 3¾ ips could be read as well as low density magnetic stripes recorded at 1⅞ ips and the selected gear ratios would be such that all of these standard recording speeds could be read at a rate of 10 characters per second. Additionally, in this regard, it should also be observed that the angle of the magnetic read head 2 may also be adjustable in the well known manner so as to accommodate magnetic cards recorded at different speeds with different, standard recording head inclinations.

The magnetic read head 2, as shown in FIG. 2, is coupled to the first stage $A_1$ of the amplifying means $A_1$–$A_3$ through the coupling capacitor $C_1$. The capacitive coupling through capacitor $C_1$ is to provide, in the conventional manner, a d.c. block between amplifying means $A_1 - A_3$ and the magnetic read head 2 so that a d.c. level from the power supplies to the amplifying means $A_1 - A_3$ does not become associated with the magnetic read head 2. The amplifying means $A_1 - A_3$ may take any conventional form of a plurality of amplifying stages which are connected in series or cascade so long as each stage exhibits high gain and a low threshold voltage with the initial amplifier stage $A_1$ being capable of recognizing an input as low as ½ mv. In an actual embodiment of the invention which was built and tested, high grade operational amplifiers were employed wherein each amplifier stage was connected in a standard inverting configuration and negative feedback was utilized in a gain control mode to limit the gain exhibited to a desired amount. Furthermore the gain characteristics of the initial amplifying stage $A_1$ may be frequency compensated. As will be apparent to those of ordinary skill in the art, although the amplifying means $A_1 - A_3$ is depicted in FIG. 2 as comprising three independent stages, it will be apparent that any number of amplifying stages may be employed so long as the criteria of relatively high gain and low threshold voltage are observed. The output of the last amplifier stage $A_3$ is connected to the input of the threshold device 4. The threshold device 4 may take the form of a conventional threshold detector, schmitt trigger or flip-flop device which recognized only signal inputs above and below predetermined values and provides an output which is preferably rectangular in response thereto. For example, assuming the input to the first amplifier stage $A_1$ is 1 mv peak-to-peak and the output of the last amplifier stage $A_3$ is 10 volts peak-to-peak with an overall signal to noise ratio of 20:1; the threshold of the threshold device 4 could be set to recognize inputs whose magnitudes exceeded the zero ordinate value of the input waveform by three volts whereupon said threshold device would respond to input pulses above and below +3 volts and −3 volts respectively and acts to provide a rectangular waveform in response thereto. The threshold device under these conditions would thereby function to establish a deadband (±3 volts in the foregoing example) about the zero ordinate axis of the input signal applied thereto and provides a rectangular output for portions of the input signal which exceed the deadband established. In this manner, the threshold device 4 acts to regenerate or reconstruct the information recorded on the magnetic medium as a rectangular waveform representative of the peak levels of the input waveform applied thereto, while noise levels which may be superimposed on the input waveforms are avoided due to the regenerative action of the threshold device which effectively establishes a deadband about the noise level of the input waveform. This is here necessary because the high gain, low threshold amplifying stages $A_1 - A_3$ are so sensitive to low magnitude input signals that the output therefrom contains substantial noise which is here effectively eliminated by the threshold device 4. If the amplifying stages $A_1 - A_3$ are each inverting stages, the threshold device may also provide an inverted output or alternatively be provided with an inverting stage at its output so that the phase relationship of the output of the magnetic read head 2 and the threshold device 4 are the same. Thus, in this manner information read by the magnetic read head 2 at slow speeds is regenerated as a rectangular waveform. The output of the threshold device 4 is applied to the jitter compensating decoder network indicated by the dashed block 6 at the input to the data gate 8 as shown in FIG. 2.

The function of the jitter compensating decoder network indicated by the dashed block 6 is to separate out true consistent data in the resulting waveform applied thereto from the clocking pulses present therein and to apply such data as separated to the single character register 16. Additionally, the jitter compensating decoder network indicated by the dashed block 6 derives clocking pulses from the regenerated rectangular input waveform applied thereto and such derived clocking pulses are employed to step data bits through the single character register 16 in a serial manner. As will be appreciated by those of ordinary skill in the art as this disclosure proceeds, clocking pulses are derived by the jitter compensating decoder network 6 from the regenerated input waveform applied thereto because when a magnetic medium recorded at high speed is read at substantially reduced speeds, jitter becomes a significant problem. Therefore, rather than providing an independent clock generator having a fixed period or repetition rate and using the input waveform to sync such generator as is conventionally done; the jitter compensating decoder network indicated by the dashed block 6 acts to derive clocking pulses from the input waveform applied thereto so that the clocking pulses are employed to decode the input waveform will jitter with such input waveform so that the onerous effects of jitter are avoided and consistent true data is obtained.

As was stated above, the jitter compensating decoder network indicated by the dashed block 6 comprises the data gate 8 which is connected to the output of the threshold device 4, as aforesaid, the data clock 10, the data flip-flop 12, the gate 13, and a data gate control 14. The data gate 8 may take the form of a conventional selective inverting gate whose inverting characteristics may be selectively inhibited by gating pulses applied to the control input thereof which is connected to conductor 26. Conventional logic circuits which may, if desired, appropriately serve in the role of the data gate 8 are known by those of ordinary skill in the art as AND/OR inverting gates and take the form of a pair of AND gates whose outputs are applied to an OR gate. The signal input to one of such AND gates is inverted and if this form of logic circuitry was employed as the data gate 8, the output of the threshold device 4 would be applied to the signal inputs of each of the AND gates while control or gating pulses would be applied to the control inputs of each of such AND gates by a bistable device to selectively enable one or the other of such AND gates so that either an inverted or noninverted output would result. The data gate 8 thereby functions to invert the regenerated waveform applied thereto by the threshold device 4 except under conditions when the inverting characteristics thereof are selectively inhibited by control pulses applied to the control input thereof through conductor 26 in which case a noninverted or true output is produced. As shall be seen below, the data gate 8 is controlled in such manner that clocking pulses present in the input waveform applied thereto are always made the falling edge of the output pulses produced thereby so that clocking pulses may be effectively derived as a function of the data gate 8 and hence be jitter free since rather than syncing an independent clock pulse generator, a derivation technique is relied upon. Although negatively directed pulse edges are here employed to derive clocking pulses, it will be apparent to those of ordinary skill in the art that positively directed pulse edges could alternatively be employed. The output of the data gate 8 is connected through conductor 24 to the trigger input of the data flip-flop 12 and through conductor 28 to the data clock 10.

The data clock 10 may take the form of a conventional monostable or one shot multivibrator which, under the conditions assumed above, should have a 10 ms. characteristic and hence produce an output pulse whose duration is 10 ms. each time it is triggered to its unstable state by an input pulse (in this case a falling edge of a pulse or a negative spike) applied thereto on conductor 28. A 10 millisecond characteristic is here selected for the data clock 10 since the recording speed and the reading speed, i.e., 10 characters per second under the conditions assumed above, are known, so it is known that the data clock 10 must produce clock pulses whose width is 10 ms. and whose period under ideal or no jitter conditions is 14 ms. Therefor the characteristic duty of the monostable multivibrator which functions as the data clock 10 is selected at 10 ms.; however, as the period of 14 ms. is only approximate due to jitter considerations which are here substantial, the data clock 10 is not provided with a fixed period but instead each 10 ms. pulse produced thereby is independently triggered so that the clock pulses produced will jitter with the input waveform applied to the input of the data gate 8. The output of the data clock 10 is applied to conductor 30 so as to serve as indicated as an input to the data flip-flop 12, the single character register 16 and single character buffer 22 and parity detector 18 while a second output from the data clock 10 is connected via conductor 33 to one input of AND gate 13. As was the case for the gearing arrangements which serve to place the magnetic read head and magnetic medium in relative motion, the timing components for the data clock 10 may be selectively variable to produce pulses of other predetermined durations so that magnetic media recorded at several conventional recording speeds may be selectively read by the variable speed reader apparatus disclosed herein.

The data flip-flop 12 may take the form of a conventional bistable flip-flop whose trigger input is connected through conductor 24 to the output of the data gate 8 and whose reset input is connected to the output of the data clock 10 through conductors 32 and 30 as interconnected through junction point J. The data flip-flop 12 thus receives the selectively inverted input from the data gate 8 at the trigger input thereto and clocking pulses which jitter therewith at the reset input thereto and, as shall be seen below, produces an output signal representative of the true data present on the magnetic medium being read. The output of the data flip-flop 12 thus represents the output of the jitter compensating decoder network indicated by the dashed block 6. The output of the data flip-flop 12 is connected as a serial input to the single character register 16 through conductor 34 and as a second input to the AND gate 13 through conductor 36.

The AND gate 13 is a conventional inverting AND logic component well known to those of ordinary skill in the art. AND gate 13 thus acts to receive the output of data clock 10 at one input thereof and the true data output of the data flip-flop at a second input thereof and produces a low level output at all times other than when both the inputs thereto are low. The output of the AND gate 13 is connected to the trigger input of the data gate control 14. The data gate control 14 may also take the the form of a conventional bistable flip-flop whose output is connected, as shown in FIG. 2, to the control or inhibit input of the data gate 8 through conductor 26 while the trigger input thereof is connected to the output of AND gate 13. The function of the data gate control 14 is to selectively inhibit the inverting characteristics of the data gate 8 by applying a pulse thereto through conductor 26 whenever the clock portion of the regenerated input waveform applied as an input thereto is not a rising edge. This occurs, as shall be seen below, when a 0 appears in the true data output of the data flip-flop 12 and hence, whenever a 0 is produced by the data flip-flop 12, the data gate control 14 is toggled to selectively change the inverting or noninverting characteristics previously established for the data gate 8 so that a correct relationship is again established. The operation of the jitter compensating decoder network indicated by the dashed block 6 will be described in detail below in conjunction with the waveforms illustrated in FIGS. 3A through F. At this point in the description of the exemplary embodiment illustrated in FIG. 2, it is sufficient to appreciate that a true data output in the form of 1's and 0's is connected from the jitter compensating decoder network indicated by the dashed block 6 to the serial input of the single character register 16 through conductor 34 while derived clocking pulses which exhibit the same jitter as the output of the threshold device 4 are applied to the single character register 16 and the parity detector 18 through conductor 32.

The single character register 16 takes the conventional form of an eight 8 bit serial in, parallel out character buffer which may be formed in the conventional manner by eight 8 serially connected flip-flops. The characters read from the magnetic medium are organized into characters comprising seven bits each and the additional bit location in the single character register 16 is provided to indicate that a complete character has been loaded. The true data output produced by the data flip-flop 12 is connected to the serial input to the single character register 16 through conductor 34 while the timing or shifting input of the single character register 16 is connected to the data clock 10 through conductors 32 and 30. When the single character register 16 is in the clear state, a 1 is always stored in the first bit location thereof while the remaining seven bit locations are in a 0 condition. The serial data input connected to conductor 34 is a timed input which looks for the first 1 to be received and in this manner it detects when data is being applied and provides a sufficient delay to avoid motor start-up speed problems. Although the timed serial input to the single character register 16 has not been illustrated in FIG. 2, it may conveniently take the form of a flip-flop whose output is connected to enable the serial input of the single character register 16 whose set input is connected to conductor 34 and whose reset input receives an enable level thereon after a 200 ms. delay from the instant a motor controlling the relative motion of the magnetic read head 2 and the magnetic medium is started. The serial data input to the single character register 16 is thereby enabled to receive data on conductor 34 in response to the first 1 bit received subsequent to the 200 millisecond 211 ms. motor start up delay. This is sufficient to receive all legitimate information produced at the true data input of the jitter compensating decoder network indicated by the dashed block 6 while avoiding spurious data problems associated with motor start up.

Through the serial data input connected to conductor 34 the single character register 16 acts to determine when data is coming in by detecting the first 1 through its timed input, as aforesaid, and from this point on each seven bits, as judged by the clocking pulses received at the timing input thereto, represents a character. As stated above, the single character register 16 is an eight bit register having a 1 bit initially present in the first storage location thereof and therefore as each of the seven bits of a character is received and shifted through the single character register 16; the storage location of this initial one bit is shifted from the first storage location to the eighth storage location. When this one bit reaches the eighth storage location, it is present as an enable level on conductor 39 and is applied to the parity detector 18 and the character detector 20. In this manner the receipt of a character is indicated and the character may be transferred to the single character buffer 22 for subsequent application to a utilization device. After each enable pulse, the single character register 16 is cleared in a conventional manner so that the next character may be received. The outputs of the first seven bit locations in the single character register 16 are connected in parallel to seven corresponding inputs of the single character buffer 22 and are additionally connected in parallel to the sampling inputs of the parity detector 18 and the character detector 20 through cable 40.

Depending upon the ulilization device employed, the single character buffer 22 may take the conventional form of either a four stage coding buffer or a seven stage register with conventional flip-flops forming each stage in either event. The four stage coding buffer would generally be employed whenever the variable speed reader apparatus depicted in FIG. 2 acts to supply the data obtained to a remotely located central computer over telephone lines or the like. Under these conditions, the seven inputs applied in parallel to the single character buffer 22 from the single character register 16 would be encoded by conventional logic circuitry into a four bit Gray or Modified ASCII Weight Code which is then stored in the four stages of the single character buffer 22. The data thus stored in the four stage single character buffer 22 may then be transmitted over standard telephone lines using conventional touch-tone techniques. Thus, if credit card reader apparatus was considered, the four stage coding buffer would generally be employed for integrated credit sales applications wherein the credit cards read were issued by national issuers, such as banks or other credit card companies who maintained central computer stations at remote locations and were not otherwise affiliated with the merchandizing site at which the credit card reader apparatus was located. Alternatively, the seven stage single character buffer would be employed when the data read is not utilized in touch-tone application but instead is applied directly in binary form to the utilization device. The seven stage single character buffer could be read out in series and/or parallel as is desired for convenient transmission or direct application to an on site computer and in the case of a credit card reader apparatus would be employed in large retailing establishments or the like which utilize their own credit card and/or integrated inventory systems.

As was stated above, the first seven outputs of the single character register 16 are not only applied in parallel to the single character buffer 22 but in addition thereto, to the parity detector 18 and the character detector 20. The parity detector 18 may be entirely conventional and may act to determine either even or odd parity. The data recorded on the magnetic medium to be read should be considered in this exemplary embodiment of the invention recorded in such a manner that in each seven bit character, six bits are representative of data while the seventh bit is assigned to provide the resulting character with an appropriate additional 1 or 0 bit so that the character formed exhibits the even or odd parity selected. When an enable level from the shifting through of the initially stored 1 bit is applied on conductor 38 to the parity detector 18, the parity detector 18 samples each of the seven outputs of the single character register 16 to determine if the appropriate odd or even parity is present. If the correct parity is detected it is assumed that no data in this character has been dropped and no output is produced by the parity detector 18. If incorrect parity is detected, bit dropout within the character sampled is indicated and the output of the single character buffer 22 is inhibited by the output of the parity detector 18 connected to conductor 42. The parity detector 18 may for instance, conveniently take the form of a parity tree comprising a tree of Exclusive OR's formed by a TTL complex function.

The character detector 20 acts to determine a start of data or SOD character which precedes the data characters recorded on the magnetic medium and the end of data or EOD character which follows the last data character thereon and functions to enable the single character buffer 22 in response to the detection of the SOD character via the output thereof connected to conductor 44 while disabling the single character buffer 22 in response to the detection of the EOD character. The character detector may conveniently take the form of two eight input AND gates wherein one of the AND gates is set to recognize the start of data or SOD character while the second AND gate is set to detect the presence of the end of data or EOD character. Seven of the inputs to each of the AND gates are to sample the seven bits of the character loaded into the single character register 16 and applied thereto via cable 40 while the eighth input thereto is for the enable pulse applied thereto through conductor 38 which indicates that a full character has been loaded into the single character register 16. Upon the detection of the SOD character, the character detector 20 enables the single character buffer 22 and conversely when the EOD character is detected, the single character buffer is disabled.

The operation of the variable speed reader apparatus and the jitter compensating decoder network therefor as shown in FIG. 2 will be explained in conjunction with the waveform illustrated in FIGS. 3A through F which represent pertinent input and output waveforms associated with certain of the illustrated components within the jitter compensating decoder network indicated by the dashed block 6. The waveforms illustrated in FIGS. 3A through F have been plotted along a common time axis, the abscissa, to enable ease in comparing the waveforms depicted so that the various input and output conditions for the components within the jitter compensating decoder network 6 which are associated therewith may be readily ascertained. For the purposes of the instant description of the exemplary embodiment of the variable speed reader apparatus depicted in FIG. 2, it will be assumed that a credit card or the like having a magnetic stripe recorded at 7½ ips according to the double frequency recording techniques described in conjunction with FIGS. 1A through 1C is to be read at a rate of 10 characters per second. In addition, for reasons which will become apparent hereinafter, the magnetic stripe should be considered to have been recorded in such manner that an arbitrarily selected start of data or SOD character precedes the data or information characters recorded, an arbitrarily selected end of data or EOD character follows the data characters which are recorded, a short string of 0's is recorded prior to the recording of the start of data or SOD character and an odd parity is selected for the characters recorded.

The credit card or the like having a magnetic stripe thereon which is to be read is initially placed in an operable relationship with the variable speed reader apparatus according to this invention in such manner that the magnetic read head 2 is resting on the beginning portions of the magnetic stripe to be read and thereafter control means, not shown, are energized to place the magnetic stripe and the magnetic read head 2 in relative motion by any of the well known techniques mentioned above so that the magnetic read head 2 is in a scanning relationship along the entire length of the magnetic stripe and is maintained in a reading relationship therewith. Thus, the magnetic read head 2 starts on the magnetic stripe and scans the same at a speed adapted to read the magnetic stripe at a rate of 10 characters per second which is the same rate that data obtained therefrom may be applied to utilization apparatus therefor employing low speed circuits. As the magnetic stripe is read at a speed which is significantly reduced from the speed at which recording took place, the output of the magnetic read head 2 does not take the form of a unipolar waveform having sharply defined 1's and 0's but instead the resulting waveform obtained, as indicated by waveform A in FIG. 2, is characterized by extremely low magnitude pulses whose rise and fall times are not substantially vertical, but instead exhibit relatively slow rates of rise and decay. In addition, due to the low speed at which the magnetic stripe is read, the jitter rate of the output of the magnetic read head 2 may be significant. The low magnitude signal produced by the magnetic read head 2 is capacitively coupled to the amplifying means $A_1 - A_3$ which, it will be recalled, comprises a plurality of high gain inverting stages which exhibit sufficiently low threshold voltages such that an input from the magnetic read head 2 as low as one-half millivolt will be recognized. The output from the magnetic read head 2 is highly amplified, as indicated by the waveforms A through D in FIG. 2, by amplifying means $A_1 - A_3$ and thereafter is applied as an input to the threshold device 4. The threshold device 4 acts as aforesaid, to recognize input levels exceeding a predetermined threshold and to regenerate therefrom a rectangular waveform representative of the recognized portions of the input waveforms applied thereto. Thus, the threshold device 4 acts on the amplified read head 2 to reconstruct or regenerate the information recorded on the car as indicated by waveform E in FIG. 2. while noise due to the high gain of amplifying means $A_1 - A_3$ is avoided due to the regenerative action of the threshold device 4 which effectively establishes a deadband about the noise level of the input as aforesaid. Since three inverting amplifier stages $A_1 - A_3$ have been shown in the exemplary embodiment of this invention depicted in FIG. 2, the threshold device 4 here should be provided with an inverting output so that the output signal produced thereby, as indicated by waveform E, will be similarly phased with respect to the output signal produced by the magnetic read head 2. The rectangular output of threshold device 4 representing the information recorded on the magnetic stripe being read is applied to the input of the data gate 8 as present in the jitter compensating decoder network indicated by dashed block 6.

The function of the jitter compensating decoder network indicated by the dashed block 6, as aforesaid, is to separate out data in the input waveform applied thereto from the clocking pulses present therein due to the double frequency recording technique employed. In brief, there is here accomplished by operating the data gate 8 in such manner that a clocking pulse is always made the falling edge of the output produced thereby so that clocking pulses may be effectively derived as a function of the data gate 8 by employing the falling edge obtained to trigger the data clock 10 when it is in its stable state. The clocking pulses thereby produced by the data clock 10 thus jitter at the same rate as the input signal applied to data gate 8 and hence may be employed to accurately separate the true data from the input signal at the data flip-flop 12. The true data obtained from the data flip-flop 12 is then timed and employed in turn at the data gate control 14 to force clocking pulses present in the output of data gate 8 to be represented as a falling pulse edge by the selective inhibiting of the inverting characteristic thereof. The detailed operation of the jitter compensating decoder network will be explained in conjunction with the waveforms illustrated in FIGS. 3A through F which illustrate exemplary inputs and outputs of various components within the jitter compensating decoder network for an exemplary start of data (SOD) character, an exemplary data character and an exemplary end of data (EOD) character. More particularly, FIG. 3A represents an exemplary waveform applied to the data input of data gate 8 by the threshold device 4, FIG. 3B represents the corresponding output of the data gate 8 which is applied as an input to data flip-flop 12 and the data clock 10, FIG. 3C represents the corresponding output of the data clock 10 which is applied as timing inputs to the data flip-flop 12 and the AND gate 13, FIG. 3D represents the corresponding true data output of the data flip-flop 12 which is the output of the jitter compensating decoder network and is applied as an input to the AND gate 13, FIG. 3E represents the output of AND gate 13 applied as an input to the data gate control 14 and FIG. 3F represents the output of the data gate control 14 which is applied as the control input to the data gate 8.

Although not shown in FIGS. 3A through F a short run of 0's precedes the start of data or SOD character and forms the initial input to the data gate 8 when the magnetic stripe is read. The initial string of 0's is employed because it is important that the data clock 10 start at the correct point. Therefore, as the magnetic read head 2 starts scanning from a position on the magnetic stripe the first bit read from such magnetic stripe cannot always be accurately identified. Accordingly, the initial portion (approximately the first three-fourths of an inch) of the magnetic stripe is recorded with all 0's bits so that regardless of the precise position of the magnetic read head 2 at the start of the reading of the magnetic stripe, both the rising and falling edges of the pulses regenerated by the threshold device 4 and applied as an input to the data gate 8 as aforesaid will represent clock pulses because in the double recording technique described in conjunction with FIGS. 1A through 1C only clock pulses and 1's cause transitions in the unipolar waveform produced and hence in a short run of 0's all transitions in the waveform as determined by the rising and falling edges of the pulses produced are due to clock pulses. The short run of 0's is thus used to initially time the data clock 10 since during a run of 0's both edges of an input pulse will be associated with a clock pulse. Therefore, the first bit which occurs at the output of data gate 8 is always a clock pulse indicating where to start. Once the data clock 10 starts at the right point, each subsequent clock pulse produced thereby will be independently triggered by the falling edges of pulses from data gate 8 when the data clock 10 is in its stable condition and hence the period at which clock pulses are produced by the data clock 10 will jitter at the same rate as the information being received. This technique is quite different from that normally employed as an independent clock pulse generator, having a fixed period is normally relied upon and clocking pulses received thereby are only utilized to sync this generator. Here, the proper starting point is ascertained and clock pulses of a fixed duration are produced; however, each pulse is independently triggered so that a fixed period is not relied upon and jitter compensation is obtained because the clock pulses employed, in a manner to be hereinafter described, to separate the clock pulses in the data train from the 1's and 0's therein exhibit the same jitter rate as the data train.

Figure 3:
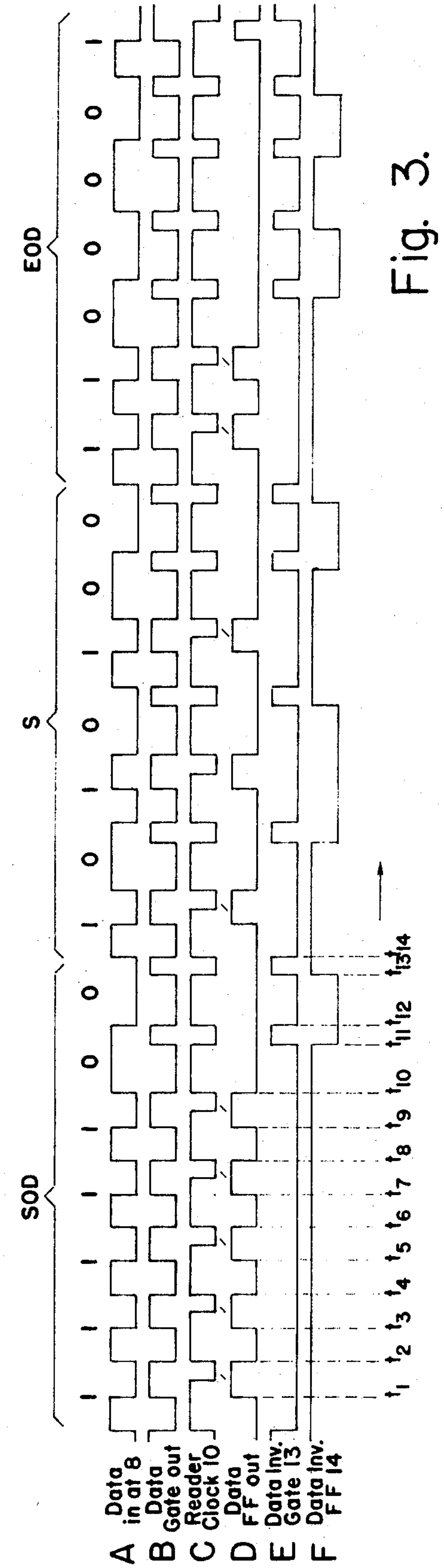
FIGS. 3A through F are waveforms which serve to illustrate the mode of operation of various ones of the components of the exemplary embodiment of the variable speed reader apparatus depicted in FIG. 2 and more particularly the jitter compensating means employed therein.

Once the data clock 10 is started at the proper point, or sync is established in the manner specified above, the data gate 8 functions to make an input clock pulse the falling edge of a pulse at all times and hence the inverting characteristics of the data gate 8 are selectively inhibited when necessary. This can best be seen by a comparison of waveforms A and B in FIG. 3 which represents the input to the data gate 8 as supplied by the threshold device 4 and the output of the data gate 8, respectively. Thus, as seen in FIG. 3, at times $t_2$, $t_4$, $t_6$, $t_8$, and $t_{10}$ for example, the input to the data gate 8, as shown by waveform A, is a rising edge associated with a clock pulse and hence the data gate 8 exhibits its normal inverting characteristics whereby the output thereof, as shown in waveform B, at times $t_2$, $t_4$, $t_6$, $t_8$, and $t_{10}$ is a falling edge associated with a clock pulse. Furthermore, as shown in waveform C, the output of the data gate 8 which is applied through conductors 24 and to the data clock 10 will trigger this monostable multivibrator, i.e., negative edge triggering, so that a fixed duration clock pulse is initiated at times $t_2$, $t_4$, $t_6$, $t_8$, and $t_{10}$. At time $t_{12}$, however, the clock pulse present in the input waveform A is associated with a falling edge of the input to data gate 8 and hence the inverting characteristics of the data gate 8 are inhibited as shown by waveform B (note inhibiting takes place during the interval $t_{11}$ to $t_{13}$) so that this clock pulse too is represented by a falling edge in the ouput of data gate 8 and, as shown by waveform C, will also cause the data clock 10 to produce an output of fixed duration. As inspection of waveforms A and B should also render it apparent that whenever a 1 bit follows a rising edge clock pulse in the input to data gate 8, the clock pulse subsequent thereto in the input waveform A is always associated with a rising edge of a pulse and hence the inverting characteristics of the data gate 8 need not be inhibited. Selective inhibiting is necessary, however, when 0's appear because the clock pulses associated therewith will govern the transitions of the input waveform, and hence will alternately be associated with falling and rising edges, respectively, of the input waveform. Thus as the appearance of a 1 in the input waveform does not alter a previously established clock pulse-edge relationship, whenever a 0 appears and the inverting characteristics of data gate 8 are required to be inhibited, such inverting characteristic remains inhibited until a second 0 appears.

The trigger input to the data flip-flop 12 is connected, as aforesaid, to the output of the data gate 8 and hence receives the B waveform as the input thereto. The output of the data clock –10 is connected through conductors 32 and 30 to the reset input of the data flip-flop 12, and although not indicated in FIG. 2, if a D type flip-flop is used, the clock output of the data clock would also be applied to the data input thereof while if a J-K binary was employed the same results would be obtained by the initial conditions set. Furthermore, it should be noted that the data flip-flop 12 may be considered to be adapted for positive edge switching and hence the reset input thereto may be differentiated. Under these conditions, as is well known to those of ordinary skill in the art, the data flip-flop 12 will toggle by switching positive if the width of data pulse applied to the trigger input thereof by the data gate 8 is shorter than the duration of the clock pulse produced by the data clock 10 and will be reset by the positive edge of the next clock pulse; however, no positive switching will take place in the absence of a positive clocking pulse indicating the direction of the transition which is to take place. An inspection of waveform D in FIG. 3, which represents an exemplary output for the data flip-flop 12 for the conditions indicated in waveforms A through C, will reveal that the conditions necessary for the data flip-flop 12 to toggle by switching positive, i.e., when the width of the data pulse in waveform B is shorter than the duration of the clock pulse being produced (waveform C), only occurs when a 1 is applied to the input of the data gate 8 and the inverted rising edge representing such 1, as shown in waveform B, is applied to the trigger input of data flip-flop 12 through conductor 24. Thus for example at times $t_1$, $t_3$, $t_5$, $t_7$, and $t_9$, as indicated in waveform D, the data flip-flop 12 toggles by switching positive in response to the lagging rising edge of the output of data gate 8 (waveform B) which is applied thereto and is reset by the leading, rising edge of the subsequent clocking pulse produced by data clock 10, i.e., shown in waveform C at times $t_2$, $t_4$, $t_6$, $t_8$, and $t_{10}$ respectively. When, however, a 0 is applied to the trigger input of the data flip-flop 12, no positive or rising edge is received prior to the termination of the clocking pulse, i.e, note waveforms B,C and D during intervals $t_{10}$ to $t_{12}$ and $t_{12}$ to $t_{14}$, and hence the data flip-flop 12 will not go positive when 0 inputs are applied thereto. Therefore, as indicated by waveform D, each time a 1 bit is present in the input waveform applied to the data gate 8 as indicated by waveform A, and hence is inverted and applied to the trigger input of the data flip-flop 12 (waveform B), the data flip-flop 12 will switch positive and thereafter be reset by the next clocking pulse to produce a well defined unipolar pulse (waveform D); however, no positive switching of the data flip-flop 12 occurs in response to a 0 input. Accordingly, the output of the data flip-flop 12 represents the true data present in the input waveform obtained by reading a magnetic stripe recorded in accordance with the double frequency technique illustrated in FIGS. 1A through 1C and since the decoding function of the data flip-flop 12 is achieved through the use of the derived clock pulses produced by the data clock 10, jitter is completely compensated because the derived clocking pulses have the same jitter rate as the data input applied thereto.

The true data signal produced at the output of the data flip-flop 12 is applied to single character register 16 through conductor 34 to be stored in a manner to be subsequently discussed and to an input of AND gate 13, through conductor 36 to be employed to control the selective inhibiting of the inverting characteristics of the data gate 8. The AND gate 13 also receives a clock pulse input through conductor 33 from the date clock 10, which serves, as will be seen below, to properly time the selective inhibiting of the inverting characteristics of the data gate 8. The AND gate 13, as stated above is an inverting AND gate and accordingly produces a high output only when both of the inputs thereto are low while producing a low output whenever either or both of the inputs thereto are high. The output of the AND gate 13 is applied to the trigger input of the data gate control 14 and since the data gate control 14 comprises an ordinary bistable flip-flop, as aforesaid, which may here be considered to accept positive triggering, each pulse applied thereto will change the state thereof. The output of the data gate control 14 is applied to the control input of the data gate 8 and although any appropriate logic sequence could be employed, a high input on conductor 26 from the data gate control 14 should be considered to maintain the data gate 8 in an inverting mode of operation while a low output therefrom on conductor 26 should be considered to inhibit the inverting characteristics of the data gate 8 so that a common phase relationship is maintained between the data input thereto and the output thereof.

As will be recalled from the discussion of the waveforms A, B and C in FIG. 3, while the appearance of a 1 bit in the input to the data gate 8 does not change a previously established edge association of the clocking pulses in the output of the data gate 8, due to the fact that a 1 will accomplish an opposite transition to return the unipolar waveform to the same position for a succeeding clock pulse as it was in for the preceding adjacent clock pulse; each 0 which appears requires a 180° phase shift in the output of the data clock 10 if clock pulses are to consistently appear as the falling edge in the output of the data gate 8 which is here the required relationship for triggering the data clock 10. Thus, if it is assumed that the clocking pulses in the output of the data gate 8 are initially properly represented by the falling edge of a pulse, as they are due to the initial syncing of the data clock 10, no change in the inverting characteristics of the data gate 8 is required when 1 bits appear; however, the inverting characteristics thereof must be inhibited upon the appearance of a 0 bit and must remain inhibited until the next 0 bit appears to restore the pulse edge relationship at the input to data gate 8. Therefore, it will be appreciated that each time a 0 appears at the input to the data gate 8 the phase of the output thereof must be changed by 180° and this may be seen upon a comparison of waveforms A and B in FIG. 3. The phase of the data gate 8 is varied, as aforesaid, by the input applied thereto on conductor 26 in such manner that the data gate 8 acts as an inverter when a high level input is applied to conductor 26 by the data gate control 14 while the inverting characteristics thereof are inhibited or no pulse edge change is induced by data gate 8 when a low level input is applied to conductor 26 by the data gate control 14. The manner in which appropriately timed control pulses are applied to the conductor 26 by the data gate control 14 is best illustrated in conjunction with waveforms E and F of FIG. 3, wherein waveform E represents the output of AND gate 13 and waveform F represents the output of data gate control 14.

As will be seen upon a consideration of waveforms A through F in FIG. 3, so long as no 0's are present in the input waveform applied to the data gate 8, as indicated by waveform A during the interval $t_1$ through $t_{10}$, clock pulses (waveform C) produced by the data clock 10 and 1 pulses produced by the data flip-flop 12 (waveform D) will be applied to the inputs of AND gate 13 in an overlapping or coincident manner such that at least one of the inputs to AND gate 13 is maintained in a high condition throughout the interval $t_1$ through $t_{11}$ and during times of coincidence between these pulses both inputs to the AND gate 13 will be a high level. Therefore, as AND gate 13 is an inverting AND gate, the output thereof during the entire interval $t_1$ through $t_{11}$ will be in a low condition, as shown by waveform E and hence the data gate control 14, which is a bistable flip-flop will be in a first state which is here a high level output as shown by waveform F. As the output of the data gate control 14 is thus high during the entire interval $t_1$ through $t_{11}$, the date gate 8 will be maintained in an inverting condition, as shown by waveform B, whereby clock pulses present therein will be maintained as the falling edges of the pulses produced and hence the data clock 10 will be properly triggered by such falling edges through the interval $t_1$ through $t_{11}$. When however, a 0 appears in the input to the data gate 8, as shown by waveform B, intermediate times $t_{10}$ and $t_{12}$ or $t_{12}$ and $t_{14}$, no 1 pulses will appear in the true data output of the data flip-flop 12 as indicated by waveform D during the interval $t_{10}$ through $t_{14}$. As a properly triggered clock pulse was produced at time $t_{10}$ (waveform C) and no 1 is produced by the data flip-flop 12 during the interval $t_{10}$ through $t_{14}$, both inputs to AND gate 13 will be low at the termination of the clock pulses at time $t_{11}$ so that the output of AND gate 13 goes high as indicated by waveform E at time $t_{11}$. The positive leading edge of the output of the AND gate 13 causes the data gate control 14 to change states as indicated by waveform F and the low level applied thereby to the control input of data gate 8 through conductor 26 causes the inverting characteristics of data gate 8 to be inhibited as indicated by waveform B at time $t_{11}$. Thus, when the next clock pulse is received at time $t_{12}$ it will also be represented as a falling edge at the output of the data gate to again properly trigger the data clock 10 at time $t_{12}$. The clock pulse produced at time $t_{12}$ will cause one input to the AND gate 13 to go high so that the output thereof, as shown by waveform E, again goes low; however, as the data gate control 14 responds only to positive going pulses no change in state occurs as indicated by waveform F. The inverting characteristics of the data gate 8, as shown by waveform B, are thus maintained in an inhibited condition until time $t_{13}$ when the clock pulse produced at time $t_{12}$ terminates. As no 1 bit was received during the interval $t_{12}$ through $t_{13}$, no 1 pulse is produced by the data flip-flop 12, as indicated by waveform D, during the interval $t_{12}$ through $t_{14}$. Therefore, when the clock pulse produced at time $t_{12}$ terminates, both inputs to AND gate 13 go low causing the output thereof to go high at time $t_{13}$ as indicated by waveform E. This causes data gate control 14 to change states, as indicated by waveform F, to thereby restore the inverting characteristics of data gate 8 so that the clock input thereto, as received at time $t_{14}$, is thereby represented as a falling edge to again properly trigger data clock 10. Thus the state of the data gate control 14 is changed in response to each 0 input received so that each clock pulse applied to the input of data gate 8 is represented as a falling edge in the output thereof.

Thus, it will be seen that the jitter compensating decoder network indicated by the dashed block 6 in FIG. 2 acts to accurately recover the true data in the waveform obtained upon the reading of a magnetic medium recorded by the double frequency recording techniques shown in FIGS. 1A through 1C by deriving timing information therefrom and employing such timing information to recover the data presented. Furthermore, the data is recovered in a highly accurate manner because the timing information, which is derived as a function of the output of the data gate 8 has the same jitter rate as the input waveform. Therefore, the timing information used to decode the data will exhibit the same jitter rate as the waveform being decoded to thereby enable the decoding to proceed in a highly accurate manner.

The true data output produced by the data flip-flop 12 in the jitter compensating decoder network indicated by the dashed block 6 is applied to the data input of the single character register 16 through conductor 34 while clocking pulses from the data clock 10 are applied to the timing or shifting input thereto through conductor 32. The single character register 16, as aforesaid, takes the form of a serial in, parallel out shift register which may be conveniently formed by eight flip-flop stages serially connected in a shifting configuration. Furthermore, as was also discussed above, when the single character register 16 is in the clear state, a 1 is always stored in the first bit location thereof while the remaining seven bit locations are in a 0 condition. The data input to the single character register 16 is a timed input, as aforesaid, which looks for the first 1 to appear at the output of the data flip-flop 12 and provides a sufficient delay to avoid motor startup speed problems. Thus, although the bit content in the start of data or SOD character shown in FIG. 3A may be arbitrarily selected, the first bit therein must be a 1 as this is the first bit applied to the timed data input of the single character register 16 to indicate that data is being applied thereto. Accordingly, the single character register 16 determines when data is being applied thereto by detecting the first 1 at the timed data input thereto and from this point on each seven bits, as judged by the clocking pulses applied to the shifting input thereof by the data clock 10, represents a character. More particularly, once the initial 1 bit is detected at the data input to the single character register 16, this bit and those succeeding it will be shifted through the single character register 16 by the clock pulses applied to the timing input thereof by the data clock 10. After seven such shift pulses have been received, the 1 bit stored in the first bit location of the single character register 16 when the same is in a cleared state will have reached the eighth bit position thereof while the remaining seven bit positions of the single character register 16 will have been loaded in inverse order with the first seven bits received from the data gate 12. When the 1 bit initially stored in the first bit position of single character register 16, under cleared conditions, is shifted to the eighth stage thereof, conductor 38 will be enabled due to the high condition of the eighth stage which thereby indicates that a full character has been loaded.

The enable level on conductor 38 is applied to the parity detector 18 and the character detector 20. The character detector 20, the parity detector 18 and the single character buffer 22 each have the output levels of the first seven stages of the single character register 16 applied in parallel thereto. The character detector 20, as aforesaid, takes the form of two eight input AND gates wherein one of said AND gates is set to recognize the start of data or SOD character while the other AND gate is set to detect the presence of the end of data or EOD character. Therefore, when character detector 20 receives the initial enable level on conductor 38, the SOD character 1111100, as shown in FIG. 3A, will have been loaded into the single character register 16 and applied in parallel to the character detector 20. The enable level and the SOD character 1111100 will meet the appropriate coincident input conditions for an output by the SOD AND gate in character detector 20 and hence an enabling pulse will be applied to the single character buffer 22 to enable the same to receive data from the character register 16. Accordingly, the seven output bits from the character register 16 will be loaded into the character buffer 22 for application under the timing from data clock 10 to a utilization device either by being encoded into a four bit touch-tone sequence for transmission through conventional telephone lines or the like, or direct loading into a seven bit buffer for direct application in either parallel or serial form to a utilization device. When the contents of the single character register 16 are loaded into the single character buffer 22, the single character register 16 is cleared and the next character applied by the data flip-flop 12 to the conductor 34 is loaded and thereafter applied to the character buffer 22 for further application to a utilization device. This continues until all of the data on the magnetic medium has been read and the end of data or EOD character, as shown in waveform A, is loaded into the single character register 16. When the character detector 20 is enabled in response to the loading of the 1100001 EOD character, the coincident input conditions of the second or EOD eight input AND gate will be satisfied and the single character buffer 22 is disabled by the output of the EOD AND gate applied thereto on conductor 44.

As each character is loaded into the single character register 16, the parity detector 18 is enabled and the seven parallel output levels from the single character register 16 applied in parallel thereto on cable 40 are sampled to determine if appropriate parity is present. The parity of the recorded information, as indicated in FIG. 3A, is odd and hence the parity detector 18 would here sample the output levels of the single character register 16 to ascertain if odd parity is exhibited by each character loaded. If odd parity is present, the operation of the variable speed reader apparatus depicted in FIG. 2 is exactly as described above; however, should odd parity not be detected it is assumed that data has been dropped and the output of the character buffer 22 will be inhibited by a control pulse on conductor 42 until a character exhibiting appropriate parity is subsequently detected.

Accordingly, the present invention allows magnetic mediums such as magnetic discs, drums, tapes or stripes on credit cards or the like to be read at speeds at which data thereon can be utilized so that only a single character register need be provided rather than a large buffer capable of storing all or a large portion of the data on the magnetic medium which is to be read. In addition, the accuracy of the data is assured because the jitter compensating decoder network indicated by the dashed block 6 in FIG. 2 will jitter with the data read and hence derived clocking pulses used for the separation of data from the double frequency input waveform are always properly timed so that they are not capable of allowing jitter in the input to lose data due to timing inaccuracies in the recovery technique.

Although the present invention has been disclosed in conjunction with the rather specific exemplary embodiment thereof disclosed in FIG. 2, many modifications and alternatives to this specifically described embodiment will be apparent to those of ordinary skill in the art. Thus, the variable speed reader apparatus disclosed herein may be employed to read a magnetic medium at any desired speed and is not limited to speeds which are substantially reduced from the recording speed employed. Furthermore, as the jitter compensating decoder network disclosed is highly advantageous due to the decoding accuracy achieved, it will be appreciated that the techniques employed therein will find application in any data retrieval system where the adverse effects of jitter are to be avoided. In addition, although specific logic components and associated conditions necessary for the operation thereof have been mentioned herein in order to clearly describe an exemplary embodiment of the present invention, similar to complementary logic configurations to those mentioned may be employed and the associated operating conditions therefor may be substituted without any deviation from the concepts of the invention disclosed herein.

While the invention has been described in connection with an exemplary embodiment thereof, it will be understood that many modifications will be readily apparent to those of ordinary skill in the art; and this application is intended to cover any adaptations or variations thereof. Therefore, it is manifestly intended that this invention be only limited by the claims and the equivalents thereof.

What is claimed is:

1. Apparatus for retrieving information from a record medium comprising:

means for receiving input signals representative of both data and timing information recorded on said record medium in the form of a rectangular waveform, said rectangular waveform exhibiting pulses whose leading and lagging edges represent binary One information and timing information;

means for translating said input signals in such manner that said leading and lagging edges of said pulses in said rectangular waveform which represent timing information are consistently rendered of a single kind and directivity of pulses in the rectangular waveform translated, and said means for translating being connected to said means for receiving input signals;

means responsive to said edges of a single kind and directivity of pulses in the rectangular waveform translated to produce clocking pulses of a predetermined duration; and decoder means responsive to said input signals in the form of the rectangular waveform translated and to said clocking pulses for deriving a true binary data output from said input signals.

2. The apparatus according to claim 1 wherein said predetermined duration of said clocking pulses is determined by the speed at which the record medium is read.

3. The apparatus according to claim 2 wherein each of said edges of a single kind and directivity of a pulse triggers the the production of a single clocking pulse having said predeter-mined duration.

4. The apparatus according to claim 2 wherein said means for translating said input signals comprises:

signal translating means for inverting input signals applied thereto in response to a first condition and for selectively translating input signals applied thereto without inversion in response to a second condition, said signal translating means including control terminal means for receiving control signals designating said first and second conditions, said signal translating means being connected to said means for receiving and obtaining input signals therefrom; and means for applying control signals indicative of said first and second conditions to said control terminal means of said signal translating means, said means for applying control signals being responsive to said true binary data output derived by said decoder means and a previously provided control signal in producing a control signal indicating one of said first and second conditions.

5. The apparatus according to claim 4 wherein each of said edges of a single kind and directivity of a pulse triggers the production of a single clocking pulse having said predetermined duration.

6. The apparatus according to claim 2 additionally comprising:

means for reading a record medium at a speed independent of the recording speed of said record medium and producing an output signal which varies in accordance with data and timing information recorded on said record medium;

means for amplifying said output signal produced by said reading means; and means for regenerating the amplified output of said reading means into a rectangular waveform exhibiting pulses whose leading and lagging edges represent binary One information and timing information as present on said record medium.

7. The apparatus according to claim 6 wherein said means for regenerating amplified output signals exhibits a preselected threshold voltage calculated to establish a deadband about the noise level associated with amplified output signals applied thereto.

8. The apparatus according to claim 7 wherein each of said edges of a single kind and directivity of a pulse triggers the production of a single clocking pulse having said predetermined duration.

9. The apparatus according to claim 7 wherein said means for translating said input signals comprises:

signal translating means for inverting input signals applied thereto in response to a first condition and for selectively translating input signals applied thereto without inversion in response to a second condition, said signal translating means including control terminal means for receiving control signals designating said first and second conditions, said signal translating means being connected to said means for receiving and obtaining input signals therefrom; and means for applying control signals indicative of said first and second conditions to said control terminal means of said signal translating means, said means for applying control signals being responsive to said true binary data output derived by said decoder means and a previously provided control signal in producing a control signal indicating one of said first and second conditions.

10. The apparatus according to claim 9 wherein each of said edges of a single kind and directivity of a pulse triggers the production of a single clocking pulse having said predetermined duration.

11. The apparatus according to claim 10 additionally comprising:

single character register means for receiving said true binary data output from said decoder means and storing a plurality of sequentially applied data bits representing a character therein; and means for receiving and further processing each data character stored in said single character register means.

12. The apparatus according to claim 11 wherein said single character register means comprises serial input, parallel output shift register means having one storage location therein for each data bit present in a character, said shift register means having a gated input thereto for recognizing the initial One bit produced by said decoder means and applied thereto, each bit of information applied to said shift register means being shifted therethrough by said clocking pulses of a predetermined duration.

13. The apparatus according to claim 12 wherein means for receiving and further processing each data character stored in said single character register means comprises single character buffer means.

14. The apparatus according to claim 13 wherein said shift register means includes an additional storage location associated with an enable bit in the form of a One bit set prior to the receipt of each character, said enable bit being shifted through said shift register means ahead of said data bits and indicating upon its arrival at the last stage of said shift register means that a complete data character has been received.

15. The apparatus according to claim 14 additionally comprising:

parity detector means for detecting the parity of each character stored in said single character register means, said parity detector means acting to inhibit said single character buffer means upon the detection of an inappropriate parity; and character detector means for recognizing start of data and end of data characters read from said record means and selectively enabling and disabling, respectively, said single character buffer means in response thereto.

16. The apparatus according to claim 5 wherein said means responsive to said edges of a single kind and directivity comprises monostable multivibrator means, said monostable multivibrator means being triggered by each pulse edge of a single kind and directivity received when said monostable multivibrator means is in a stable state whereby the clock pulses produced thereby jitter with said input signal in the form of a rectangular waveform.

17. The apparatus according to claim 16 wherein said monostable multivibrator means has an adjustable duty cycle whereby said predetermined duration of said clocking pulses may be varied to accomodate different reading speeds for recorded information.

18. The apparatus according to claim 16 wherein said decoder means comprises bistable flip-flop means, a first input to said bistable flip-flop means being connected to an output of said signal translating means while a second input thereto is connected to said monostable multivibrator means.

19. The apparatus according to claim 18 wherein means for applying control signals to said control terminal means of said signal translating means comprises AND gate means connected to an input to bistable multivibrator means, said bistable multivibrator means having the output thereof connected to said control terminal means of signal translating means and said AND gate means having one input thereto connected to an output of said bistable flip-flop means and another input thereto connected to receive clocking pulses from said monostable multivibrator means.

20. The apparatus according to claim 19 wherein aid monostable multivibrator means has an adjustable duty cycle whereby said predetermined duration of said clocking pulses may be varied to accomodate different reading speeds for recorded information.

21. Apparatus for retrieving information from a record medium comprising:

means for reading a record medium at a speed independent of the recording speed of said record medium and producing an output signal which varies in accordance with data and timing information recorded on said record medium;

means for amplifying said output signal produced by said reading means;

means for regenerating the amplified output of said reading means into a rectangular waveform exhibiting pulses whose leading and lagging edges represent binary One information and timing information as present on said record medium, said means for regenerating said amplified output signals exhibiting a preselected threshold voltage calculated to establish a deadband about the noise level associated with amplified output signals applied thereto; and means for receiving said regenerated rectangular waveform and obtaining true binary data therefrom.

22. The apparatus according to claim 21 wherein said means for receiving said regenerated rectangular waveform and obtaining true binary data therefrom comprises:

means for translating said regenerated rectangular waveform in such manner that said leading and lagging edges of said pulses in said rectangular waveform which represent timing information are consistently rendered of a single kind and directivity of pulses in the rectangular waveform translated;

means responsive to said edges of a single kind and directivity of pulses in the rectangular waveform translated to produce clocking pulses of a predetermined duration as a function of said translating means; and decoder means responsive to said input signals in the form of the rectangular waveform translated and to said clocking pulses for deriving a true binary data output from said regenerated rectangular waveform.

23. The apparatus according to claim 22 wherein each of said edges of a single kind and directivity of a pulse triggers the production of a single clocking pulse having said predetermined duration.

24. The apparatus according to claim 23 wherein said means for translating said input signals comprises:

signal translating means for inverting input signals applied thereto in response to a first condition and for selectively translating input signals applied thereto without inversion in response to a second condition, said signal translating means including control terminal means for receiving control signals designating said first and second conditions, said signal translating means being connected to said means for receiving and obtaining input signals therefrom; and means for applying control signals indicative of said first and second conditions to said control terminal means of said signal translating means, said means for applying control signals being responsive to said true binary data output derived by said decoder means and a previously provided control signal in producing a control signal indicating one of said first and second conditions.

25. The apparatus according to claim 24 additionally comprising:

single character register means for receiving said true binary data output from said decoder means and storing a plurality of sequentially applied data bits representing a character therein; and means for receiving and further processing each data character stored in said single character register means.

* * * * *